Patented Feb. 12, 1946

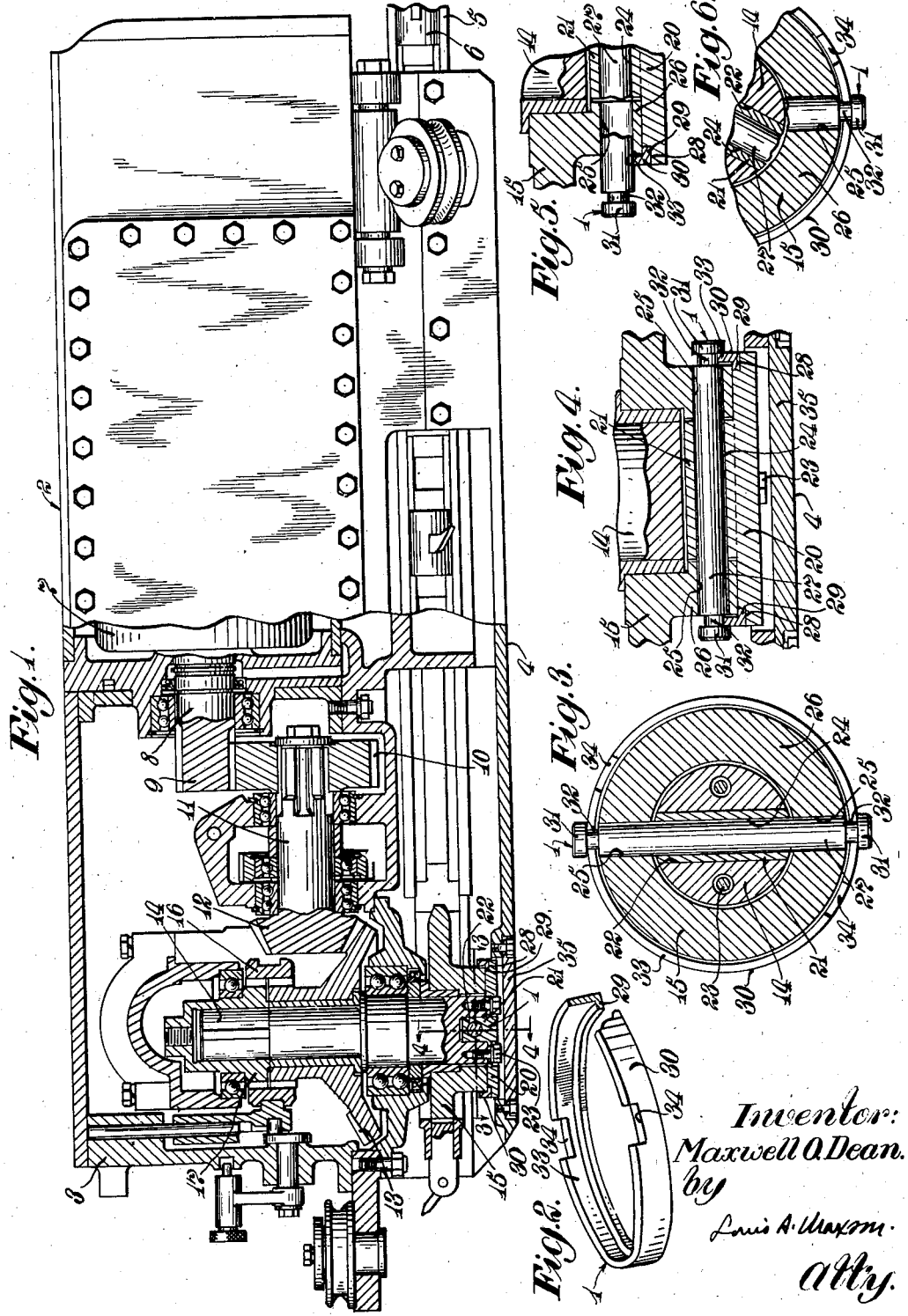

2,394,669

UNITED STATES PATENT OFFICE 2,394,669

OVERLOAD RELEASE DEVICE

Maxwell O. Dean, Logan, W. Va., assignor to Sullivan Machinery Company, a corporation of Massachusetts Application April 20, 1942, Serial No. 439,660

5 Claims. (Cl. 64—28)

This invention relates to overload release devices and more particularly, but not exclusively, to an improved shear pin construction especially designed for use in the drive for the cutter chain sprocket of the cutting mechanism of a coal cutting machine.

The present invention is an improvement over that disclosed in a copending application to Leon E. Simmons, Ser. No. 401,700, filed July 10, 1941, now matured into Patent No. 2,298,316, patented October 13, 1942. In the use of the Simmons invention, while overload of the cutter chain drive is adequately avoided, it is relatively difficult, and comparatively time consuming, to replace a broken shear pin, due to the lack of space, particularly in the rather close quarters at the coal face of an underground coal mine. In the replacement of a broken shear pin, it is necessary so to rotate the drive shaft and sprocket parts relative to each other that the pin fragments shall be brought into alinement, thereby to enable the pin fragments to be driven out of the openings in the cap lug and sprocket hub. Since the relative positions of the shear pin fragments can not be readily observed, it takes some time, with the trial and error method which must be used, before the pin fragments can be brought into alinement.

In a preferred illustrative embodiment of the present invention, the shear pin has at least one projecting end appropriately shaped so that a suitable releasing instrument can be engaged therewith, thereby to enable an end fragment of the broken pin to be withdrawn from the opening in the hub of the chain sprocket. When this end fragment of the pin has been removed, it is a comparatively simple matter by looking through the empty opening to bring the hub opening into alinement with the other pin fragments and once such alinement is attained, it is an easy matter to insert a suitable tool into the empty opening and drive out the remaining pin fragments. It has been found possible with the improved shear pin construction to save a large part of the time that would otherwise be required in replacing a fractured shear pin.

It is an object of the present invention to provide a novel overload release device having a shear element of a novel design adapted to fracture upon overload and which is readily and quickly replaceable. Another object is to provide an improved shear pin construction which is relatively simple in design and lends itself to ready and rapid replacement. A further object is to provide an improved shear pin construction of a novel design especially adapted for use with the cutter chain sprocket with the cutting mechanism of a coal cutting machine. Yet another object is to provide an improved shear pin having projecting ends shaped for engagement with a suitable releasing instrument thereby to facilitate removal of the pin fragments in the event the pin becomes broken. How these and other objects are accomplished, and the advantageous features of the invention, will be best understood from the following detailed description wherein a preferred and illustrative embodiment is set forth, reference for the purpose being had to the accompanying drawing, in which:

Fig. 1 is a view partially in side elevation and partially in longitudinal vertical section of a coal cutting machine in which a preferred illustrative embodiment of the invention is incorporated.

Fig. 2 is a perspective view shown partially in section, of the pin retaining sleeve.

Fig. 3 is an enlarged horizontal sectional view taken substantially on line 3—3 of Fig. 1.

Fig. 4 is an enlarged vertical sectional view taken substantially on line 4—4 of Fig. 1.

Fig. 5 is a fragmentary sectional view taken on the plane of Fig. 4, showing an end fragment of the shear pin partially removed from a hub opening.

Fig. 6 is a fragmentary sectional view taken on the plane of Fig. 3, showing a relation of the parts when the shear pin is broken.

In the preferred illustrative embodiment of the invention, the improved shear pin construction, generally designated 1, is embodied in a coal cutting mechanism, generally designated 2, herein preferably of the flexibly fed, room and pillar type adapted to rest upon and slide over a mine floor during a cutting operation. However, it will be evident that the improved shear pin construction may be embodied in coal cutting machines of other types, and that features of the invention may be incorporated in other types of apparatus.

The coal cutting machine 2 may be similar to that disclosed in the Joy and Simmons Patent No. 2,131,178, patented September 27, 1938, and comprises a machine frame 3 having a skid plate 4. Secured within the machine frame and projecting horizontally lengthwise thereof is an elongated plane cutter bar 5 having an endless cutter chain 6 guided for circulation about its margin. Also carried by the machine frame is a motor 7 having fixed to its power shaft 8 a spur gear 9 meshing with a spur gear 10. The gear 10 is fixed to a longitudinal shaft 11 suitably journaled within the machine frame, and this shaft has secured thereto and drives a bevel gear 12 meshing with a bevel gear 13. The hub of the bevel gear 13 is journaled on a bearing supported by a vertical shaft 14 in turn suitably journaled within the machine frame. Connected to the lower end of shaft 14, through the improved shear pin construction, is a chain sprocket 15 which engages and drives the cutter chain. The bevel gear 13 is connectible to the shaft 14 by a conventional sliding clutch having a shiftable toothed clutch element 16 engageable with clutch teeth on the bevel gear hub and connectible to clutch teeth on a clutch member 17 keyed to the upper end of the shaft 14. Thus, when the clutch is connected, the cutter chain may be driven by the motor through the spur gearing 9, 10, bevel gearing 12, 13, shaft 14 and the chain sprocket 15. The motor 7 also effects drive of the flexible feeding means of the machine in the manner fully described in the patent above referred to, but since the feeding means does not enter into the present invention, it is not illustrated and described herein.

As mentioned above, the shear pin construction 1 is an improvement over that disclosed in the copending Simmons application Ser. No. 401,700, and includes a bottom cap or cap plate 20 having a transverse projection 21 which is received in a transverse slot or recess 22 in the lower end of the cutter chain drive shaft 14. This bottom cap or cap plate is secured to the shaft, as by screws 23, and serves to retain the chain sprocket in position on its bearing. The cap projection 21 is traversed by an opening 24 adapted to register with alined openings 25 in the hub 26 of the chain sprocket. A replaceable shear element such as a shear pin 27 of a novel design, is received in these openings 24, 25 for connecting the chain sprocket to the drive shaft 14. The cap 20 is annularly grooved or recessed at 28 at its outer periphery for the reception of an inwardly directed, bottom flange 29 of an annular sleeve 30 which encircles the lower portion of the chain sprocket hub. This shear pin has projecting ends 31 exteriorly of the sprocket hub and these projecting pin ends are annularly grooved at 32 to receive the upstanding flange 33 of the sleeve so that this sleeve may serve to retain the shear pin against axial displacement from the cap-lug and sprocket-hub openings. The vertical flange 33 of this sleeve is slotted or notched at 34 at diametrically opposite points (Fig. 2) to permit insertion of the shear pin within the sprocket hub and cap openings. This sleeve is held in position within the cap groove between the bottom of the groove and the lower surface of the chain sprocket hub in the manner shown in Fig. 4, and thus normally rotates with the sprocket and cap. The bottom plate 4 of the coal cutting machine has a detachable cover plate 35 which may be detached to obtain access to the detachable cap 20 simply by turning the machine onto its side and removing the attaching screws.

The manner of use of the improved shear pin construction will now be described. In the event the cutter chain of the cutting mechanism of the coal cutting machine for any reason becomes overloaded, the shear pin 27 will shear, releasing the chain sprocket from its drive shaft thereby automatically preventing breakage of the associated relatively costly parts of the cutter chain drive. Shearing of the pin takes place between the inner surface of the hub bore of the cutter chain sprocket and the outer end surfaces of the cap projection 21, and, when shearing occurs, the cap 20 and so the drive shaft 14 and its associated elements, are free to turn with respect to the cutter chain sprocket and, of course, drive of the cutter chain sprocket is no longer possible until the shear pin is replaced. The shear pin can be readily replaced simply by turning the retaining sleeve 30 relative to the chain sprocket to bring the notches 34 in the sleeve into registry with the openings 25 in the sprocket hub and inserting a suitable releasing instrument such as a lever bar, within the annular groove 32 in one of the end pin projections 31 and withdrawing the fragment of the pin projection so engaged from the bore in the sprocket hub in the manner shown in Fig. 5. When the shear pin is broken or sheared off due to overload, the pin fragments may assume the position shown in Fig. 6, out of alinement, and when the end pin fragment has been removed from its bore, it is a comparatively easy matter to turn the sprocket relative to the shaft to bring the openings 24 and 25 into alinement. When the openings are in alined position, a suitable instrument may be inserted within the opening 25 in the sprocket hub so that the remaining pin fragments may be easily driven out from their bores. A new shear pin may then be inserted within the cap and sprocket hub bores and the sleeve 30 may then be rotated to bring the vertical sleeve flange 33 within the grooves 32 thereby to retain the new shear pin in position. Under certain conditions, a fractured shear pin may be replaced by turning the machine on its side and removing the cover plate 35 so that access to the bottom cap 20 may be obtained. The cap 20 may then be removed from the shaft 14 and the shear pin fragments withdrawn in the manner above described from the openings in the sprocket hub and cap projection. However, under some conditions it is not possible to turn the machine onto its side, and therefore the method first described is preferred.

As a result of this invention, an improved overload release device is provided which is of a comparatively simple construction and lends itself to ready and rapid replacement. It will further be evident that a novel shear pin construction is provided which may be readily applied to a conventional coal cutting machine with a minimum of change and expense. It will also be evident that by the provision of the novel shear pin provided with projecting end portions having releasing grooves, the shear pin fragments, when the shear pin is broken, may be readily and quickly removed. Other uses and advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In a shear pin construction, relatively rotatable driving and driven elements, said elements having openings disposable in alinement, a shear pin insertable axially in the alined openings for connecting said elements together and adapted to fracture upon overload, said shear pin having an end portion projecting outwardly from said elements, said projecting end portion being grooved inwardly of its outer extremity and externally of said elements, and an annular member surrounding said elements and having a portion receivable in the groove in said pin for retaining said pin against endwise displacement from said openings.

2. In a shear pin construction, relatively rotatable driving and driven elements, said elements having openings disposable in alinement, a shear pin insertable axially in said alined openings for connecting said elements together and adapted to fracture upon overload, said shear pin having an end portion projecting outwardly from said elements, said projecting end portion being grooved inwardly of its outer extremity and externally of said elements, and an annular member surrounding said elements and having a portion receivable in the groove at one side of said pin for retaining said pin against endwise displacement from said openings, the groove in said projecting pin end at the opposite side of said pin being shaped to receive a suitable releasing instrument and providing a shoulder with which the instrument is engageable, said end portion when fractured being adapted to be withdrawn by said instrument upon release of said retaining element from said groove.

3. In a device of the character described, relatively rotatable elements having transverse openings disposable in alinement, a replaceable shear member insertible axially in said alined openings for connecting said elements for rotation together and adapted to fracture upon overload, said shear member having an end portion projecting outwardly from said elements, said projecting end portion being grooved inwardly of its outer extremity and externally of said elements, and a retaining ring surrounding said elements and having a portion received in said groove for retaining said shear member against endwise displacement from said openings.

4. In a device of the character described, relatively rotatable elements having transverse openings disposable in alinement, a replaceable shear member insertible axially in said alined openings for connecting said elements for rotation together and adapted to fracture upon overload, said shear member having an end portion projecting outwardly from said elements, said projecting end portion being grooved inwardly of its outer extremity and externally of said elements, and a retaining ring surrounding said elements and having a portion received in said groove for retaining said shear member against endwise displacement from said openings, said retaining ring having a portion cut away and rotatable into a position to disconnect said first mentioned portion from said groove and to bring its cut-away portion in registry with said openings to permit endwise withdrawal of said shear member.

5. In a device of the character described, relatively rotatable elements having transverse openings disposable in alinement, a replaceable shear member insertible axially in said alined openings for connecting said elements for rotation together and adapted to fracture upon overload, said shear member having an end portion projecting outwardly from said elements, said projecting end portion being grooved inwardly of its outer extremity and externally of said elements, and a retaining ring surrounding said elements and having a portion received in said groove at one side of said pin for retaining said shear member against endwise displacement from said openings, said retaining ring having a portion cut away and rotatable into a position to disconnect said first mentioned portion from said groove and to bring its cut-away portion in registry with said openings to permit endwise withdrawal of said shear member, and said groove at the opposite side of said pin providing a shoulder accessible exteriorly of said ring and with which a suitable releasing instrument is engageable to enable an endwise withdrawal pressure to be applied to said shear member.

MAXWELL O. DEAN.